(12) United States Patent
Mittal et al.

(10) Patent No.: US 11,586,369 B2
(45) Date of Patent: Feb. 21, 2023

(54) HYBRID HARDWARE-SOFTWARE COHERENT FRAMEWORK

(71) Applicant: Xilinx, Inc., San Jose, CA (US)

(72) Inventors: Millind Mittal, Saratoga, CA (US); Jaideep Dastidar, San Jose, CA (US)

(73) Assignee: XILINX, INC., San Jose, CA (US)

( * ) Notice: Subject to any disclaimer, the term of this patent is extended or adjusted under 35 U.S.C. 154(b) by 632 days.

(21) Appl. No.: 16/425,841

(22) Filed: May 29, 2019

(65) Prior Publication Data

US 2020/0379664 A1    Dec. 3, 2020

(51) Int. Cl.
  *G06F 3/06*    (2006.01)
  *G06F 13/42*   (2006.01)

(52) U.S. Cl.
  CPC .......... *G06F 3/0646* (2013.01); *G06F 3/0604* (2013.01); *G06F 3/067* (2013.01); *G06F 13/4234* (2013.01)

(58) Field of Classification Search
  CPC ....... G06F 3/0646; G06F 3/0604; G06F 3/067
  See application file for complete search history.

(56) References Cited

U.S. PATENT DOCUMENTS

| | | | |
|---|---|---|---|
| 6,608,813 B1 | 8/2003 | Chiussi et al. | |
| 6,914,907 B1 | 7/2005 | Bhardwaj et al. | |
| 8,422,493 B2 | 4/2013 | Kono et al. | |
| 8,787,374 B2 | 7/2014 | Maeda et al. | |
| 9,306,845 B2 | 4/2016 | Kumagai et al. | |
| 9,391,835 B2 | 7/2016 | Aoshima et al. | |
| 9,525,591 B2 | 12/2016 | Yasuda et al. | |
| 9,794,194 B2 | 10/2017 | Yasuda et al. | |
| 10,097,466 B2 | 10/2018 | Tang et al. | |
| 10,409,743 B1 | 9/2019 | Mittal et al. | |
| 10,528,513 B1 | 1/2020 | Chan et al. | |
| 10,698,824 B1 | 6/2020 | Mittal et al. | |

(Continued)

FOREIGN PATENT DOCUMENTS

EP    2515294 A2    10/2012

OTHER PUBLICATIONS

U.S. Appl. No. 16/208,260, filed Dec. 3, 2018, Entitled: "Scratchpad Memory Management in a Computing System", San Jose, CA US.

(Continued)

*Primary Examiner* — Baboucarr Faal
(74) *Attorney, Agent, or Firm* — Patterson + Sheridan, LLP (57) ABSTRACT

Examples herein describe an accelerator device that shares the same coherent domain as hardware elements in a host computing device. The embodiments herein describe a mix of hardware and software coherency which reduces the overhead of managing data when large chunks of data are moved from the host into the accelerator device. In one embodiment, an accelerator application executing on the host identifies a data set it wishes to transfer to the accelerator device to be processed. The accelerator application transfers ownership from a home agent in the host to the accelerator device. A slave agent can then take ownership of the data. As a result, any memory operation requests received from a requesting agent in the accelerator device can gain access to the data set in local memory via the slave agent without the slave agent obtaining permission from the home agent in the host.

20 Claims, 5 Drawing Sheets

(56) References Cited

U.S. PATENT DOCUMENTS

| | | |
|---|---|---|
| 2007/0294485 A1 | 12/2007 | Zeffer et al. |
| 2009/0006668 A1 | 1/2009 | Vasudevan et al. |
| 2014/0181394 A1* | 6/2014 | Hum .................... G06F 12/082 711/146 |
| 2017/0060606 A1 | 3/2017 | Hollinger |
| 2018/0287964 A1 | 10/2018 | Gray |
| 2018/0314540 A1* | 11/2018 | Iyer .................... G06F 9/45558 |
| 2019/0004990 A1 | 1/2019 | Van Doren et al. |
| 2019/0042292 A1 | 2/2019 | Palermo et al. |
| 2019/0042425 A1 | 2/2019 | Shifer |
| 2019/0042518 A1 | 2/2019 | Marolia et al. |
| 2019/0065426 A1 | 2/2019 | Das Sharma et al. |
| 2019/0102311 A1* | 4/2019 | Gupta ................. G06F 12/0884 |
| 2020/0042446 A1 | 2/2020 | Mittal et al. |
| 2020/0044895 A1 | 2/2020 | Mittal et al. |

OTHER PUBLICATIONS

U.S. Appl. No. 16/053,488, filed Aug. 2, 2018, Entitled: "Hybrid Precise and Imprecise Cache Snoop Filtering", San Jose, CA US.

U.S. Appl. No. 16/141,704, filed Sep. 25, 2018, Entitled: "Scalable Coherence Management Independent of Transport Protocol", San Jose, CA US.

U.S. Appl. No. 16/053,384, filed Aug. 2, 2018, Entitled: "Logical Transport Over a Fixed Pcie Physical Transport Network", San Jose, CA US.

U.S. Appl. No. 16/025,762, filed Jul. 2, 2018, Entitled: "Logical Transport Overlayed Over a Physical Transport Having a Tree Topology", San Jose, CA US.

U.S. Appl. No. 16/024,500, filed Jun. 29, 2018, Entitled: "Transparent Port Aggregation in Multi-Chip Transport Protocols", San Jose, CA US.

U.S. Appl. No. 15/967,473, filed Apr. 30, 2018, Entitled: "Circuit for and Method of Providing a Programmable Connector of an Integrated Circuit Device".

Yunlong Xu et al: "Lock-based Synchronization for GPU Architectures", CF' 16 Proceedings of the ACM International Conference on Computing Frontiers, ACM, 2 Penn Plaza, Suite 701 New York NY 10121-0701 USA,May 16, 2016, pp. 205-213, XP058259517, DOI: 10.1145/2903150.2903155, ISBN: 978-1-4503-4128-8 p. 205-p. 207.

* cited by examiner

HYBRID HARDWARE-SOFTWARE COHERENT FRAMEWORK

TECHNICAL FIELD

Examples of the present disclosure generally relate to an accelerator that uses a collaborative hardware-software coherent framework to transfer data between a host and an accelerator device.

BACKGROUND

In the traditional I/O model, a host computing system interfaces with a peripheral I/O device (e.g., an accelerator) when executing accelerator tasks or functions using custom I/O device drivers unique to the peripheral I/O device. The disadvantage of this model is that all accelerator-memory interactions must go through the home agent node in the main CPU-memory complex, sometimes referred to as a server host. This model uses hardware enforced coherency and thus, regardless of whether the accelerator-memory data footprint is orders of magnitude (MB, GB, or even TB) larger than a cacheline, all accelerator-memory interactions are both serviced and tracked by the home agent node even if the processor (producer) on the server host may eventually only access a fraction of that data footprint on which the accelerator has performed computations over. Another disadvantage is that all memory accessed and cached by the accelerator is remote, server host attached memory. A further disadvantage of this model is that a PCIe I/O based accelerator is unable to cache the memory. Accelerator-memory interactions only take place with server host attached memory and the latency, bandwidth, and protocol messaging overhead disadvantages of that approach.

Meanwhile, the hardware cache-coherent shared-memory multiprocessor paradigm leverages a generic, instruction set architecture (ISA)-independent, model of interfacing in the execution tasks or functions on multiprocessor CPUs. The generic, ISA-independent (e.g., C-code) model of interfacing scales with both the number of processing units and the amount of shared memory available to those processing units. Traditionally, peripheral I/O devices have been unable to benefit from the coherent paradigm used by CPUs executing on the host computing system.

SUMMARY

Techniques for transferring ownership of a data set to an accelerator device are described. One example is a computing system that includes a host comprising a processing unit, a home agent (HA), and an accelerator application and an accelerator device communicatively coupled to the host where the accelerator device comprises a request agent (RA) configured to perform at least one accelerator function, a slave agent (SA), and local memory and where the local memory is part of a same coherent domain as the processing unit in the host. The accelerator application is configured to transfer ownership of a data set from the HA to the accelerator device and the accelerator device is configured to store a latest copy of the data set into the local memory, service a memory request from the RA using the SA, and transfer ownership of the data set back to the HA.

One example described herein is an accelerator device that includes a RA comprising a compute engine configured to perform at least one accelerator function, a SA comprising a memory controller, and memory. The RA is configured to receive ownership of a data set from a HA in a host coupled to the accelerator device to the SA, where the ownership is transferred by a software application. The memory controller is configured to service a request, transmitted by the compute engine, to access the data set stored in the memory once ownership has been transferred to the SA. The RA is configured to transfer ownership from the SA back to the HA.

One example described herein is a method that includes transferring ownership of a data set from an HA in a host to an accelerator device where the accelerator device is communicatively coupled to the host and a coherent domain of the host is extended into the accelerator device, moving the data set into local memory in the accelerator device, servicing a memory request from a RA in the accelerator device using a SA in the accelerator device, and transferring ownership from the accelerator device back to the HA.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe an accelerator device (e.g., a peripheral I/O device or accelerator-attached memory) that shares the same coherent domain as hardware elements in a host computing device. As a result, the compute resources in the coherent domain of the accelerator device can communicate with the host in a similar manner as CPU-to-CPU communication in the host. This means the compute resources can take advantage of coherency type functions such a direct communication (without address translation), more efficient memory usage, non-uniform memory access (NUMA) awareness, and the like. Coherent memory relies on fine-grained memory management where a home agent node manages memory at a cacheline level.

However, accelerator tasks typically handle large chunks of memory which may be better managed using software coherency rather than hardware coherency, where a home agent in the host manages the data handled by the accelerator device. For example, a disadvantage with the hardware coherency model is that all Accelerator-Memory interactions still first go through the server host. This model uses hardware enforced coherency regardless of whether the Accelerator-Memory data footprint is orders of magnitude (MB, GB, or even TB) larger than a cacheline and regardless of whether the memory is accelerator-attached, all accelerator-memory interactions are still first serviced and tracked by the host even if the processor (producer) may eventually only access a fraction of that data footprint on which the accelerator has performed computations over. Software coherency, in contrast, is where the accelerator device manages the data stored in its memory, similar to the traditional host-I/O model, where the host transfers a large chunk of data to the I/O device, the device processes the data, and the I/O device informs the host when the processed data is ready. In the meantime, the software coherency model guarantees that the host does not access the data until the I/O accelerator processed data is ready.

The embodiments herein describe a mix of hardware and software coherency, to create a hybrid hardware-software framework, which reduces the overhead of managing data when large chunks of data are moved from the host into the accelerator device when the host and the accelerator are in the same coherent domain. In one embodiment, an accelerator application executing on the host identifies a data set it wishes to transfer to the accelerator device to be processed. The accelerator application informs the accelerator device via software coherent methods by modifying metadata about the data or by modifying a control data structure accessed by the accelerator device. In response, the accelerator device transmits a request to the host, using hardware coherent techniques, asking for the most up-to-date version of the data set and that no cached copies of the data set remain in the host. Using hardware coherent techniques, the host then ensures that the most up-to-date version of the data is stored in memory in the accelerator device, and invalidates all copies of the data set in CPU cache. The requesting agent in the accelerator device begins processing the data set in local memory via the slave agent in accordance with the acceleration application. In one embodiment, the requesting agent can cache subsets of the local memory and process the cached copy. Software coherency has guaranteed that any memory operation requests received from a requesting agent in the accelerator device can access the data set in local memory via the slave agent without the slave agent obtaining permission from the host. For example, the slave agent does not need to check with the home agent whether there is a more up-to-date version of the data set or check if a cached copy remains of the data to be processed by the accelerator device. When the accelerator device is done processing the data set, the accelerator device flushes the cached subsets, updates local memory, and transfers ownership back to the home agent in the host via software coherent methods, for example by the accelerator device modifying metadata or a control data structure accessed by the host processors. This re-establishes the host as the enforcer of hardware coherency of the data set with the rest of the system, similar to when a task is complete in the traditional host-I/O model where the accelerator device is in a different domain than the host. Thus, the accelerator device and the host, by being in the same coherency domain and relying on hardware coherency enforcement, avoid the high overhead that occurs when transferring ownership, via software methods, of large chunks of data to local memory in the accelerator device. The accelerator device and the host, by being in the same coherency domain, can also avoid the high overhead of moving the processed data from local memory in the accelerator device back to the host.

Figure 1:
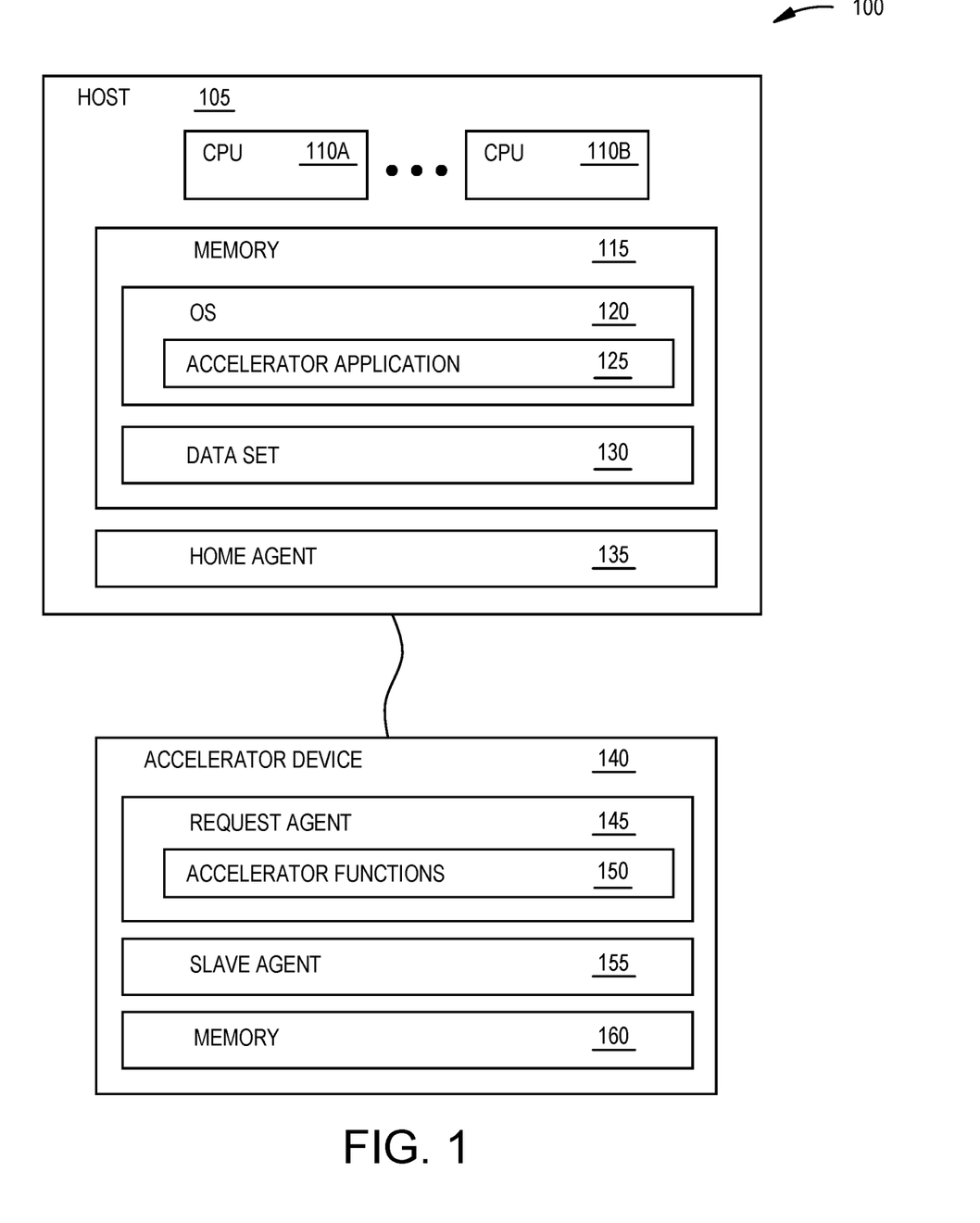
FIG. 1 is a block diagram of a host coupled to an accelerator device, according to an example.

FIG. 1 is a block diagram of a computing system 100 that includes a host 105 coupled to an accelerator device 140, according to an example. The accelerator device 140 can be any device (e.g., a peripheral I/O device) that performs tasks issued by the host 105. In one embodiment, the host 105 is communicatively coupled to the accelerator device 140 using a PCIe connection. In another embodiment, the accelerator device 140 is part of host-attached memory rather than a separate I/O device. The host 105 can represent a single computer (e.g., a server) or multiple physical computing systems that are interconnected. In any case, the host 105 includes multiple CPUs 110, memory 115, and a home agent 135.

The memory 115 includes an operating system (OS) 120 which can be any OS capable of performing the functions described herein. In one embodiment, the OS 120 (or a hypervisor or kernel) establishes a cache-coherent shared-memory multiprocessor paradigm for the CPUs 110 and memory 115. In one embodiment, the CPUs 110 and the memory 115 are OS managed (or kernel/hypervisor managed) to form a coherent domain that follows the cache-coherent shared-memory multiprocessor paradigm.

In the embodiments herein, the shared-memory multiprocessor paradigm is available to the accelerator device 140 along with all the performance advantages, software flexibility, and reduced overhead of that paradigm. Further, adding compute resources in the accelerator device 140 to the same coherent domain as the CPUs 110 and memory 115 allows for a generic, ISA-independent development environment.

In one embodiment, the accelerator device 140 and the host 105 use a coherent interconnect protocol to extend the coherent domain of the host 105 into the accelerator device 140. For example, the accelerator device 140 may use cache coherent interconnect for accelerators (CCIX) for extending the coherent domain within the device 140. CCIX is a high-performance, chip-to-chip interconnect architecture that provides a cache coherent framework for heterogeneous system architectures. CCIX brings kernel managed semantics to the accelerator device 140. Cache coherency is automatically maintained between the CPU(s) 110 on the host 105 and the various other accelerators in the system which may be disposed on any number of peripheral I/O devices.

However, other coherent interconnect protocols may be used besides CCIX such as QuickPath Interconnect (QPI), Omni-Path, Infinity Fabric, NVLink, or OpenCAPI to extend the coherent domain in the host 105 to include compute resources in the accelerator device 140. That is, the accelerator device 140 can be customized to support any type of coherent interconnect protocol which facilitates forming a coherent domain that includes the compute resources in the accelerator device 140.

In one embodiment, the HA 135 executes coherency actions for the memory in the system 100—both the memory 115 in the host 105 and the memory 160 in the accelerator device 140. In a coherent system, memory address ranges are homed by a specified HA, which provides the advantage of rapid coherency resolution to cache lines accessed by the CPUs 110 in the host 105 as well as a request agent 145 in the accelerator device 140. The HA 135 ensures that the most up-to-date versions of data, which can be stored in different locations (or caches) simultaneously, is retrieved when a request to read or modify that data is received. Those requests can originate from a CPU 110 or a request agent (e.g., the request agent 145) in an attached accelerator device 140. Although one HA 135 is shown, the computing system 100 can have any number of HAs where each HA serves for the home as different memory address ranges.

The accelerator device 140 can be many different types of peripheral devices such as a pluggable card (which plugs into an expansion slot in the host 105), a system on a chip (SoC), a graphics processing unit (GPU), a field programmable gate array (FPGA) and the like. For example, the accelerator device 140 can include programmable logic (e.g., a programmable logic array) or may not include any programmable logic, but instead contain solely hardened circuit (which may be software programmable).

The accelerator device 140 includes the request agent (RA) 145, a slave agent (SA) 155, and memory 160 (also called local memory). In one embodiment, the RA 145 is a compute engine that is optimized to perform a special computation. In one embodiment, the RA 145 is hardware, firmware, or combinations thereof. For example, the RA 145 may be one or more compute engines implemented in programmable logic. In another example, the RA 145 may be a compute engine formed from hardened circuitry (e.g., a core in a GPU or other ASIC). In any case, the RA 145 performs accelerator functions 150 for the accelerator device. These functions 150 can be part of a machine learning accelerator, a cryptographic accelerator, graphics accelerator, search accelerator, decompression/compression accelerator, and the like. In one embodiment, the accelerator functions 150 are implemented in programmable logic (e.g., a programmable logic array) in the accelerator device 140. In another embodiment, the accelerator functions 150 are implemented in hardened logic (which may be software configurable) such as processing cores or engines.

Generally, the compute engine or engines in the RA 145 perform the accelerator functions 150 faster or more efficiently than if these same functions were performed using one or more of the CPUs 110 in the host 105. Although one accelerator function 150 is shown, and one accelerator application 125 is shown, the computing system 100 can have any number of accelerator functions, where each accelerator function is processing a different data set in memory.

In one embodiment, the SA 155 is a memory controller (which can be a hardware circuit) that services requests to read data from, or write data to, the memory 160. The RA 145 ensures that coherency is maintained when data memory operations are performed from the RA 145 to the memory 160. For example, if the RA 145 wants to read data from the memory 160, the RA 145 may first send a request to the HA 135 to determine whether a more up-to-date version of the data is available elsewhere in the system 100. Further, although the memory 160 is shown within the accelerator device 140, in another embodiment the memory 160 may be on a separate chip (e.g., attached memory) from an integrated circuit forming the accelerator device 140.

As described in more detail below, the SA 155 has different functions depending on the current phase or configuration of the system 100. In one phase, the HA 135 is the sole agent for data stored in the memory 160 and the SA 155 functions like a typical memory controller in a coherent system. However, in another phase, the software coherency has given the SA 155 ownership of the data stored in the local memory 160 and the RA 145 does not need to ask the HA 135 for permission when processing data stored in the memory 160. For example, when the RA 145 wants to read data from the memory 160 to perform the accelerator functions 150, in the second phase, the SA 155 can provide that data without the RA 145 first checking with the HA 135 to ascertain whether there is a more up-to-date version of that data elsewhere in the system 100 (e.g., stored in memory 115 or in an in-chip cache in one of the CPUs 110).

While the RA 145 is illustrated as being separate for the memory 160, in one embodiment, the RA 145 may be a compute engine that is embedded within the memory 160 and performs in-memory computation. In that case, rather than the accelerator device 140 having a physically distinct RA 145 and SA 155 as shown in FIG. 1, accelerator locality can be in-memory with a RA 145 and SA 155 that are logically distinct and perform in-memory computation.

Figure 2:
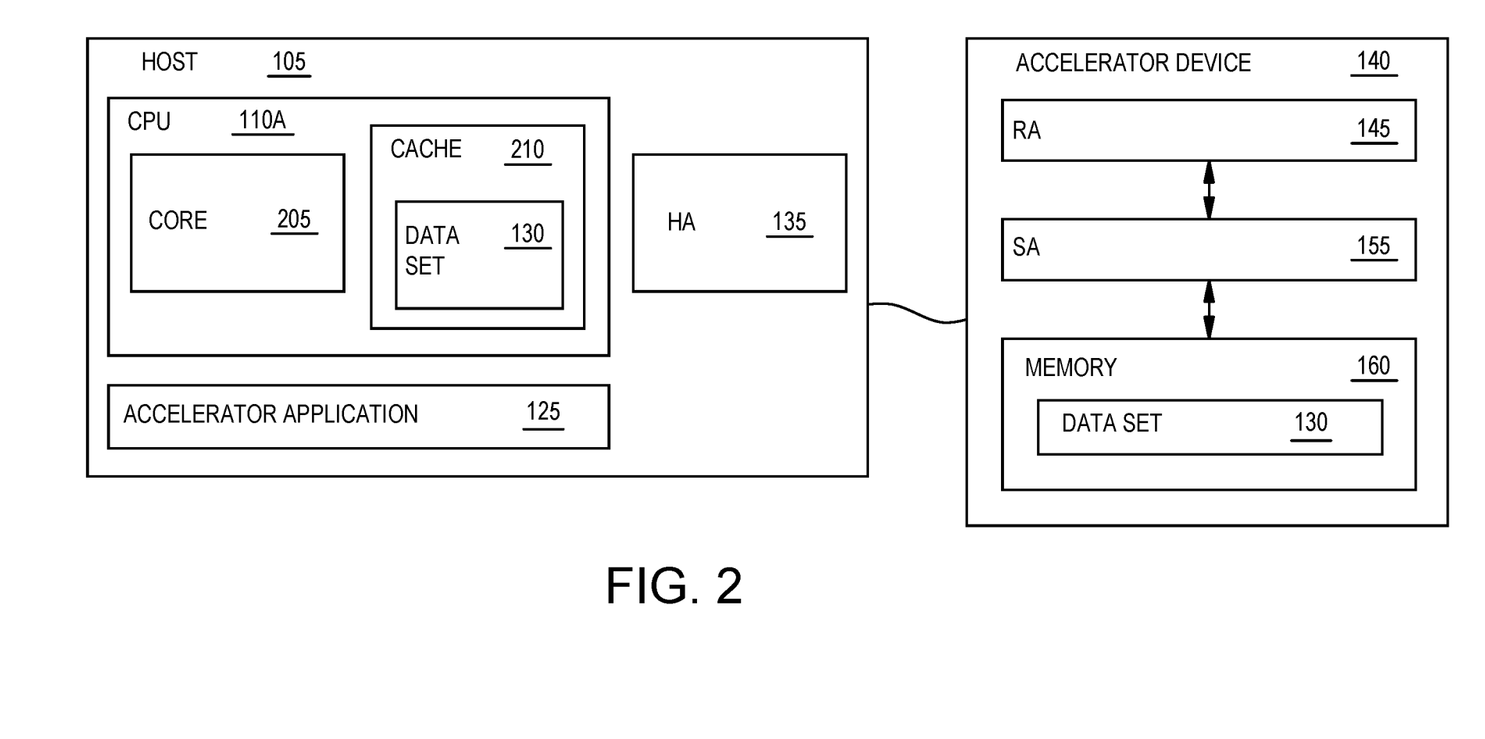
FIG. 2 is a block diagram of a host coupled to an accelerator device, according to an example.

FIG. 2 is a block diagram of a host 105 coupled to an accelerator device 140, according to an example. Unlike a traditional I/O model, the memory 160 and the processing elements in the accelerator device 140 (e.g., the RA 145 and SA 155) are in the same coherent domain as the CPU 110 and memory in the host 105. As such, the HA 135 in the host 105 ensures that the data stored in the host 105 and the accelerator device 140 are stored coherently so that a request for a memory operation, whether originating in the host 105 or the accelerator device 140, receives the most up-to-date version of the data regardless whether that data is stored in memory in the host 105 or the accelerator device 140.

In some applications, the bottleneck when processing data occurs from moving data to the compute unit that processes that data, rather than the time it takes to process that data. Stated differently, instead of the processor or compute engine being the bottleneck, moving the data to and from the processor or compute engine is what limits the speed at which the operation can be performed. This situation occurs often when accelerators are used since accelerators have specialized compute engines (e.g., accelerator engines) that can perform certain types of functions exceptionally fast. Often, what limits the efficiency of using an accelerator is not the compute engines but rather the ability of the system to move data to the accelerator for processing. Situations where moving the data to the compute engine limits the time required to complete a task is referred to as a computational memory bottleneck. Moving the compute engine closer to the data can help alleviate this issue.

In a first embodiment, a traditional I/O data sharing model can be used where large chunks of data are moved from the host 105 to the accelerator device 140. However, the host 105 and the accelerator device 140 are no longer in the same coherency domain. As a result, the I/O based accelerator device is unable to cache the memory, which further separates the compute engine (e.g., the RA 145) from the data it needs to process. Instead of using hardware coherency, software coherency is used where a software application (e.g., the accelerator application 125) establishes with the HA 135 what data it wants to manage and transfer to the accelerator device 140 (e.g., the data set 130). Once the accelerator device 140 completes processing the data, the accelerator application 125 can again take ownership of the data and maintain (or reestablish) hardware coherency for that data with the HA 135.

In a second embodiment, the host 105 and the accelerator device 140 can share the same coherent domain so that the data can be cached in the accelerator device 140 to help alleviate a computational memory bottleneck. For example, the memory may be attached to the host 105 (e.g., host attached memory) while the data can be stored within a cache in the RA 145. However, the disadvantage of this model is that all Accelerator-Memory interactions go through the HA 135 in the main CPU-Memory Complex in the host 105. This embodiment also uses hardware enforced coherency and thus, regardless of whether the Accelerator-Memory data footprint is orders of magnitude (MB, GB, or even TB) larger than a cache line, all Accelerator-Memory interactions are both serviced and tracked by the HA 135 even if the CPU 110 (producer) may eventually only access a fraction of that data footprint on which the accelerator device 140 has performed computations over. Put differently, the HA 135 must track all the data sent to the cache in the RA 145 even if the CPU 110A may access only a small portion of that data. The other disadvantage is that all memory accessed and cached by the accelerator device 140 is remote, host attached memory.

In a third embodiment, the memory that stores the data which is processed by the accelerator device 140 is attached to (or is in) the accelerator device 140 (e.g., the memory 160) but is homed by the HA 135 in the host 105. In this embodiment, the disadvantage of the second embodiment also applies, in that all Accelerator-Memory interactions still go through the HA 135 in the host 105. However, unlike the previous embodiment, once ownership of the cache line is obtained by the accelerator device 140, updates to the data set 130 can take place locally to the memory 160. This embodiment also uses hardware enforced coherency and thus, the other disadvantage of the second embodiment also applies in that regardless of whether the Accelerator-Memory data footprint is orders of magnitude (MB, GB, or even TB) larger than a cache line and regardless of whether the memory is accelerator-attached, all Accelerator-Memory interactions are still first serviced and tracked by the HA 135 even if the CPU 110A may eventually only access a fraction of that data set 130 that was processed by the accelerator device 140.

Rather than the three embodiments above, a collaborative framework can be used where the benefits of the first, second, and third embodiments above are incorporated into the system while avoiding their disadvantages. In addition to the benefits above, the collaborate framework has additional advantages. In one embodiment, the memory continues to be homed by the HA 135 in the host 105, continuing to provide the advantage of rapid coherency resolution to cache lines accessed by the CPUs 110 in the host 105. Also, as opposed to requiring that all accelerator accesses to memory are tracked by software coherency at a coarse level like in the first embodiment, or that all accelerator accesses to memory have fine-grained tracking as in the second and third embodiments, in the collaborative framework only the fine-grained subset of Accelerator-Memory interactions first go through the HA 135 in the to claim ownership.

As for another advantage of the collaborative framework, unlike software coherency where all memory pages or the entire memory block may be flushed out of the CPU caches (e.g., cache 210), for the subset of Accelerator-Memory interactions that goes to the HA 135, only the portion that is cached in the Host CPU 110 are snooped out of the CPU Cache 210. Accelerator-Memory interactions that do not touch the contents of the CPU Cache 210 can continue to be cached providing the CPUs 110 (and their cores 205) with low latency access to that data.

As for another advantage of the collaborative framework, unlike in the second and third embodiments where Accelerator-Memory interactions only take place with Host attached memory and the latency, bandwidth, and protocol messaging overhead disadvantages of that approach, with the collaborative framework, Accelerator-Memory interactions can take place on accelerator attached memory 160, where the accelerator locality is near-memory or in-memory providing a low-latency, high-bandwidth dedicated pathway and also minimizing protocol messaging overhead due to the subsequent private Accelerator-Memory interactions between the RA 145 and the SA 155.

As for another advantage of the collaborative framework, unlike in the third embodiment where even though the accelerator locality is near-memory or in-memory, interactions with memory requires home node ownership. In the collaborative framework, once the accelerator device 140 claims ownership of the data set 130 on which computation is going to be performed, all subsequent computational memory actions take place with no interactions with the HA 135 until ownership is returned to the HA 135.

The embodiments that follow describe different techniques for achieving the advantages above using a collaborative framework. However, the collaborative framework is not limited to these advantages. Some implementations of the framework may have fewer advantages than the ones listed above, while other implementations may have different advantages not listed.

Figure 3:
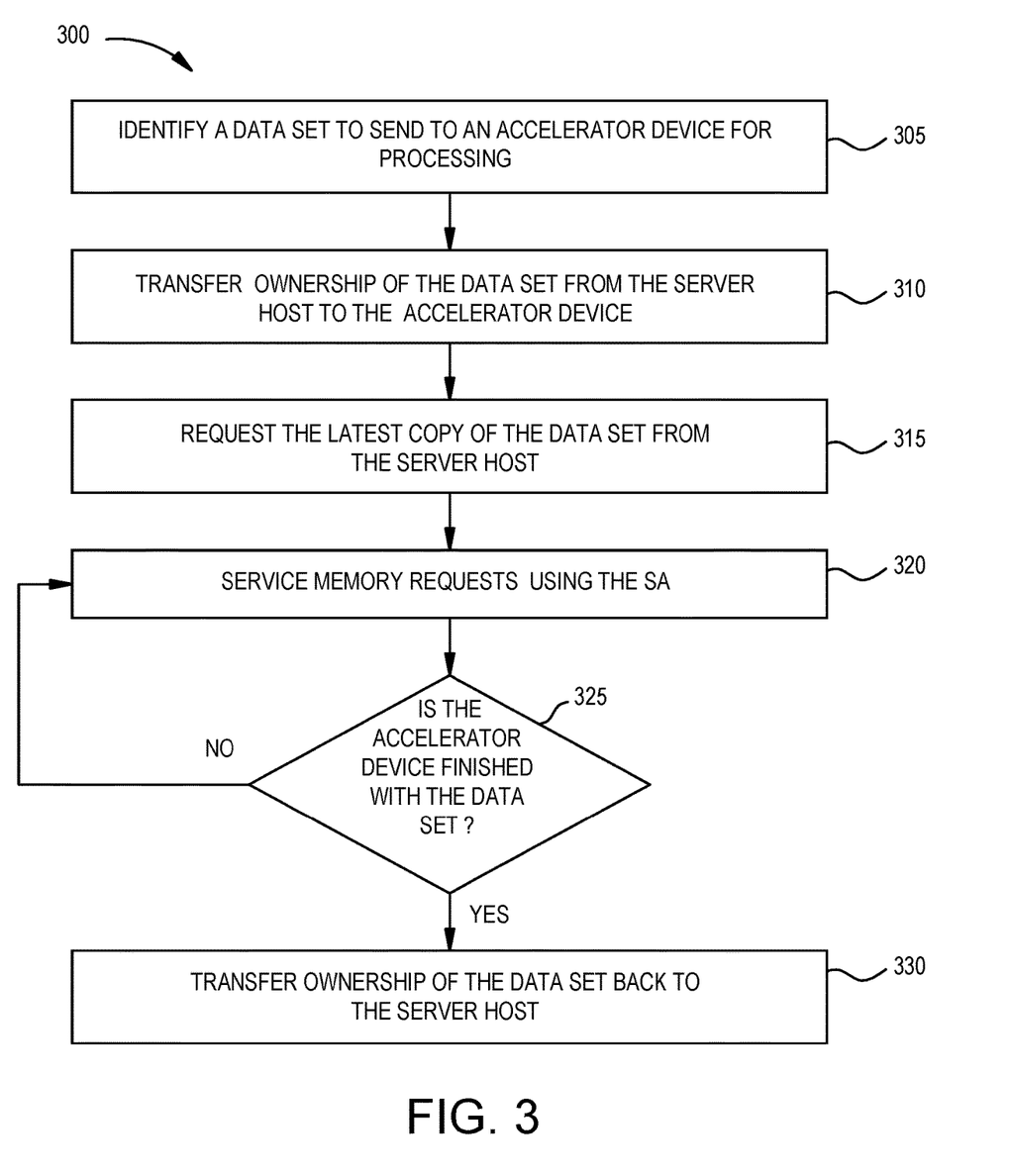
FIG. 3 is a flowchart for using a collaborative hardware-software coherent framework, according to an example.

FIG. 3 is a flowchart of a method 300 for using a collaborative hardware-software coherent framework, according to an example. At block 305, the accelerator application identifies a data set to send to an accelerator for processing. In one embodiment, the accelerator application is a software application that performs a task that can benefit from the accelerator device. For example, the accelerator application may be a machine learning application where the accelerator device includes one or more machine learning engines, a video application where the accelerator device performs graphics processing, a search engine where the accelerator device searches for a particular word or phrase, or a security application where the accelerator device performs encryption/decryption algorithms on data.

In any case, the accelerator device may be aware of the collaborative framework that permits the ownership of data to be transferred from HA on the host to a SA on the accelerator device while the host and the accelerator device share the same coherency domain. As such, the accelerator device can identify the data set it wishes to transmit to the accelerator device as part of the collaborative framework.

At block 310, the accelerator application (e.g., or some other software application) transfers ownership of the data set from the server host to the accelerator device. In one embodiment, the accelerator application updates metadata or a flag that is monitored by the accelerator device. Updating this transfers ownership of the data set from the HA to the accelerator device (e.g., the RA in the accelerator device). This transfer of ownership lets the hardware in the accelerator device know it can work on the data set without worrying about the HA in the host (since the accelerator device now owns the data set).

In one embodiment, the accelerator application transfers ownership for only the subset of the data on which computational memory actions are to going to be performed. That is, the accelerator application can identify only the data the accelerator device will process as part of its accelerator functions. As such, the accelerator application in the host can transfer ownership for only the data the accelerator device will process. This is an advantage over the traditional I/O model and software coherency where the all pages or the entire memory block is flushed out of the CPU caches rather than just the required data set (which may be a subportion of those pages and memory blocks).

At block 315, the accelerator device (or more specifically, the RA) exercises its ownership of the data set by requesting the latest copy of the data set from the server host. Doing so moves the data set into local memory in the accelerator device. In one embodiment, the data set may be guaranteed to be in the local memory of the accelerator device as part of maintaining hardware coherency between the host and the accelerator device. In that case, the data set identified at block 305 may already be stored in the local memory in the accelerator before the accelerator application transfers ownership at block 310. However, in another embodiment, the RA (or accelerator device) may use a flush and/or invalidate command to ensure the data set is moved to the local memory in the accelerator device, and/or no cached copies remain. The various techniques for ensuring the local memory in the accelerator device contains the most up-to-date version of the data set are described in more detail later in FIG. 4.

At block 320 the RA services memory request using the SA. When the SA services memory requests in the accelerator device, the SA can service those requests without first checking with the HA whether, for example, more up-to-date versions of the data are available elsewhere in the system. That is, the data set is now homed by the accelerator device.

In one embodiment, while the data set is homed by the accelerator device, the HA does not track any modifications to the data set. This reduces the overhead in the system since an RA can read and modify the data set without the SA first needing permission from the HA. As discussed above, the HA tracks the data on a per cache line basis which means each cache line in the data set would need to be checked by the HA before servicing the memory operations. However, now that the SA homes the data set, this function is performed solely by the SA without aid from the HA in the host.

Moreover, while the data set is being processed by the RA and as long as the RA has not indicated it is done, software coherency ensures that a CPU in the host can only read the data set, not write it. Software coherency can also ensure that were a CPU to read data that has yet to be updated, the CPU, in performing that read, must not derive any meaning from reading a "stale" value. Only after the accelerator has handed ownership back to the software/HA, can CPUs derive meaning from the value in the updated data.

At block 325, the RA determines whether it was finished with the data set. If the RA has not finished performing its accelerator functions on the data set, the method 300 repeats to 320 where the RA continues to transmit additional memory requests to the SA for portions of the data set. However, once the RA has completed processing the data set, the method 300 proceeds to block 330 where the RA transfers ownership of the data set back to the HA. Thus, rather than the software transferring ownership as performed at block 310, at block 330, it is the hardware in the accelerator device that sets software accessible metadata indicating to the accelerator application that the accelerator device is done with the data set. In one embodiment, the RA updates metadata for the case where the producer-consumer model requires informing the CPU when the RA has completed performing the accelerator functions on the data set. The HA can ensure hardware coherency of that data (which has been modified) is maintained (or is reestablished) with the entities within the host, such as host-attached memory and caches in the CPUs. Stated differently, the software (e.g., the accelerator application) exercises ownership of the data set implicitly using the HA. The accelerator application only knows the HA as the coherency enforcer.

Figure 4:
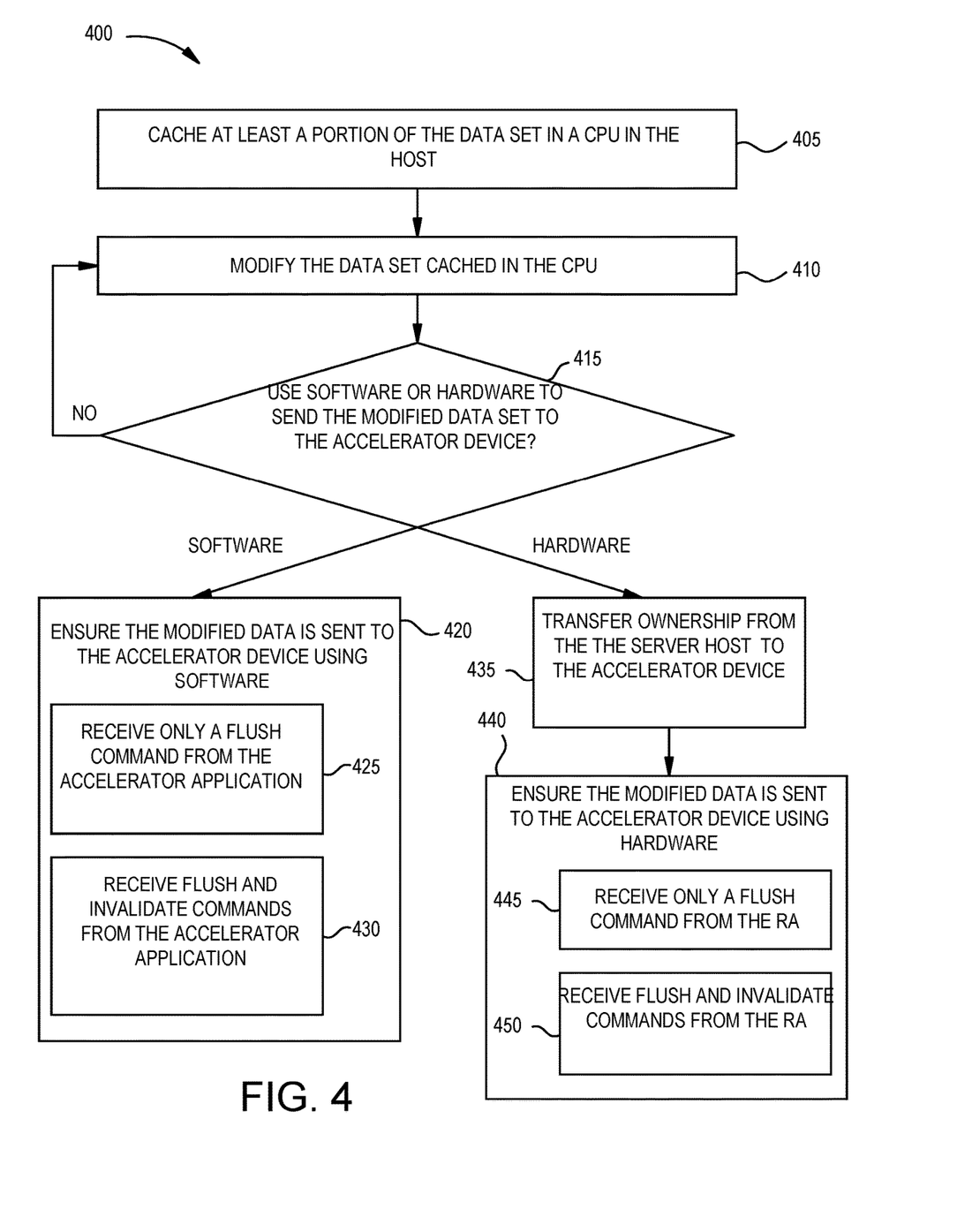
FIG. 4 is a flowchart for using a collaborative hardware-software coherent framework, according to an example.

In one embodiment, transferring the ownership of the data set from the HA to the SA and back to the HA as shown in method 400 can be considered as a type of software coherency, although different from the software coherency used in the traditional I/O model since a target data set is identified and flushing/invalidating the caches in the host (e.g., the CPU caches) is not required.

FIG. 4 is a flowchart of a method 400 for using a collaborative hardware-software coherent scheme, according to an example. Generally, method 400 describes different techniques for moving data from various memory elements in the host to local memory in the accelerator device so that the HA can transfer ownership of the data to the SA as described in the method 300.

At block 405, a CPU caches at least a portion of the data set. That is, before the accelerator application transfers ownership of the data set, some of the data set may be stored in a cache in the CPU. At block 410, the CPU modifies the portion of the data set stored in its cache. That is, before the accelerator application transfers ownership at block 310 of method 300, some of the data set may be stored in various caches and memory in the host. The data set stored in the various caches can either be duplicate copies of the memory in the host or updates to the data set as a result of the software (e.g., the accelerator application) exercising ownership of the data set implicitly using the HA. As such, before transferring ownership of the data set to the SA in the accelerator device, the system needs a technique for ensuring the most recent up-to-date version of the data set is stored in the accelerator-attached memory—i.e., the local memory.

At block 415, the method 400 splits depending on whether software or hardware is used to send the modified data set to the accelerator device. That is, the task for ensuring that the accelerator device has the most up-to-date data set can be performed by either the software—e.g., the accelerator application—or the hardware in the accelerator device—e.g., the RA.

Assuming software is assigned this task, the method 400 proceeds to block 420 where the accelerator application in the host ensures that the modified data is sent to the accelerator device. In one embodiment, the block 420 is performed before the accelerator device has transferred ownership of the data set from the HA in the host to the accelerator device (e.g., before block 310 in the method 300).

There are at least two different options for moving the modified data in the server to the accelerator device which are illustrated as alternative sub-blocks 425 and 430. At block 425, the HA receives only a flush command from the accelerator application. In one embodiment, this flush command is a persistent flush, or flush to target, to ensure that all the modified data (e.g., the modified data in the CPU caches) has been updated in persistent (i.e., nonvolatile) memory or the target memory in the accelerator device. In response to the flush command, the HA ensures the modified data is flushed from the various caches in the host and is copied into the local memory in the accelerator device.

The CPUs in the host either invalidate the cache, or keep a cached clean copy of the contents corresponding to the data set for future low-latency re-reference. In this example, the HA may not receive an explicit invalidate command from the accelerator application, but the CPUs may go ahead and invalidate the portion of their data set stored in their caches. In another example, the CPUs can keep their own local copies of the data set (which they can modify) while the data is being homed by the SA in the accelerator device.

In an alternative embodiment, at block 430, the HA receives flush and invalidate commands from the accelerator application. In response, the CPUs in the host flush and invalidate their caches.

In one embodiment, the flush and invalidate commands described in blocks 425 and 430 are cache maintenance operations (CMOs) which automatically ensure the modified data set (e.g., the most recent up-to-date data set) is stored in the local memory. In one embodiment, there are two types of CMOs the accelerator application could issue: one that only guarantees that the most recent up-to-date data set is stored in the local memory but permits the CPU to maintain a cached copy (e.g., only a flush command), and another which not only guarantees that the most recent up-to-date data set is stored in the local memory but also that no cached copies remain (e.g., flush and invalidate commands).

Returning to block 415, if the hardware in the accelerator device, rather than software, is tasked with ensuring it receives the modified data set, the method proceeds to block 435 where the hardware waits until the accelerator application transfers ownership of the data set to the accelerator device (as discussed in block 310 of the method 300). Once this transfer of ownership occurs, the method 400 proceeds to block 435 where the hardware in the accelerator device (e.g., the RA) issues one or more CMOs to ensure that the modified data is sent to the accelerator device. Like with block 420, there are at least two different options for moving the modified data in the host to the accelerator device which are illustrated as alternative sub-blocks 445 and 450. At block 445, the HA receives only a flush command from the RA. The actions that can be taken by the CPUs in the host can be the same as the ones described in block 425, and thus, are not repeated here.

Alternatively, at block 450, the HA receives flush and invalidate commands from the RA. In response, the CPUs in the host flush and invalidate their caches, as described in block 430.

In one embodiment, the HA may have a last level cache. When transferring ownership, the HA may ensure that the up-to-date data set is not stuck in the last level cache, but instead, is copied into the local memory of the accelerator device. The final state in the last level cache is the same as that of the CPU cache, and consistent with the actions in the CPU cache resulting from either block 420 or block 440.

Some further non-limiting advantages of the techniques described in FIGS. 3 and 4 are that with memory continuing to be homed by the HA in the Host (when the data is not being homed by the SA on the accelerator), all caching and coherency actions by the CPUs to memory are resolved rapidly by the local HA thus maintaining high performance CPU-Memory access even though the collaborative framework exists in parallel. Further, the collaborative framework may request ownership of only a subset of Accelerator-Memory interactions to exercise the separate or combined CMO and Ownership Request to the HA. By transferring ownership on only the relevant subset, the accelerator has a performance advantage by not having to claim ownership of the entire data set as would be required of a pure Software Coherency Model in the traditional I/O model.

A further advantage is that CPU-Memory interactions may also gain a performance advantage in that the subset that does not overlap with Accelerator-Memory interactions continues to be serviced by the local HA maintaining high performance CPU-Memory access. Moreover, in one embodiment, only the data subset shared between the CPU and Accelerator is flushed out of the CPU Caches and the contents not shared with the accelerator can continue to be cached in the CPU providing the CPUs with low latency access to that data. Also, Accelerator-Memory interactions in execution of the computational memory domain specific architecture take place on a low-latency, high-bandwidth dedicated pathway independent of CPU-Memory interactions. The software coherency subset of the collaborative framework can guarantee that the metadata handoff between the host and accelerator allows for independent CPU-Memory execution and Accelerator-Memory execution thus improving the overall cross-sectional bandwidth, latency, and program execution performance of both the CPU and Accelerator device.

Further, while the embodiments above specifically describe a hybrid hardware-software coherency framework for computational memory bottlenecks, similar techniques can be applied to related CPU-Accelerator shared memory applications.

Figure 5:
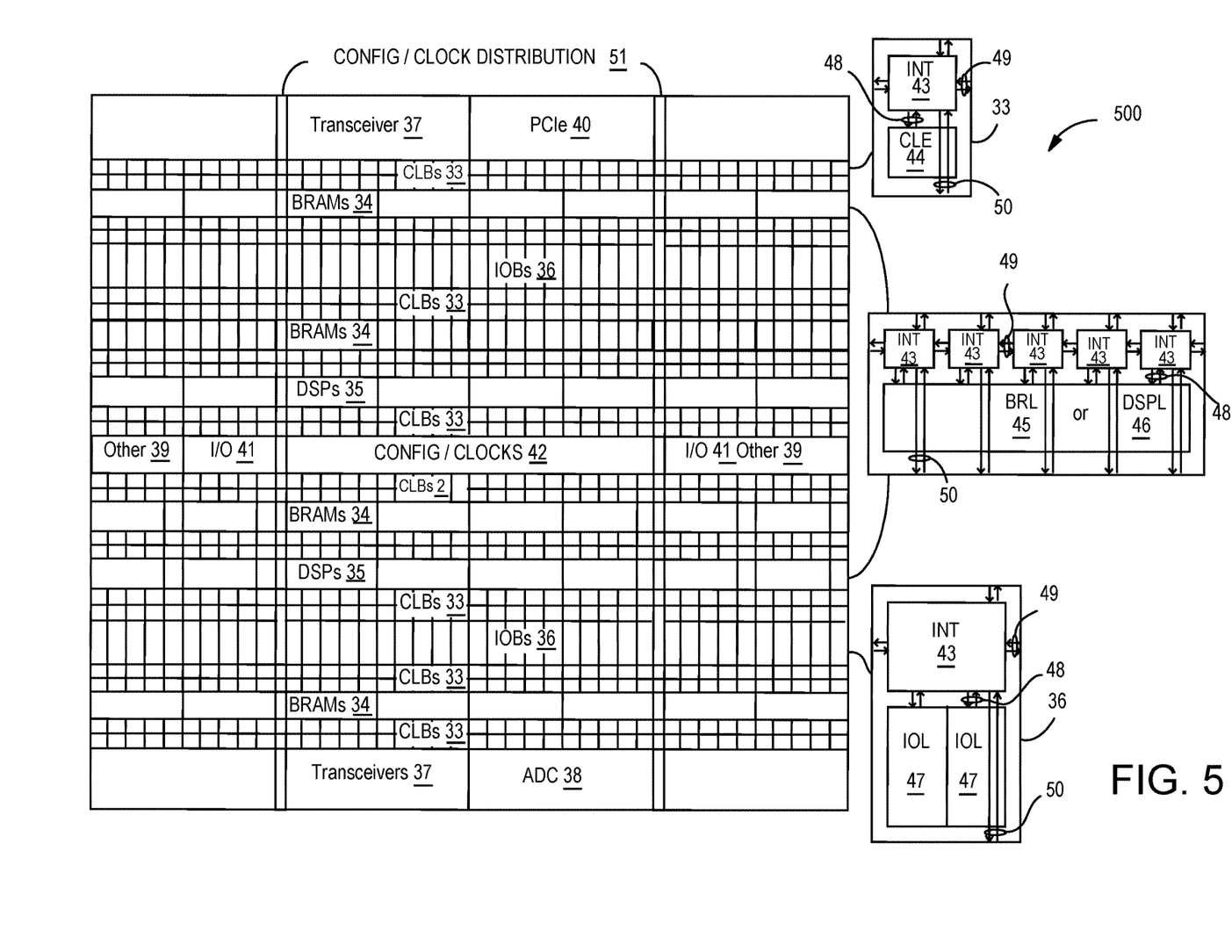
FIG. 5 illustrates a field programmable gate array implementation of a programmable IC according to an example.

FIG. 5 illustrates an FPGA 500 implementation of the accelerator device 140, and more specifically with a FPGA with a PL array that includes a large number of different programmable tiles including transceivers 37, CLBs 33, BRAMs 34, input/output blocks ("IOBs") 36, configuration and clocking logic ("CONFIG/CLOCKS") 42, DSP blocks 35, specialized input/output blocks ("IO") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 5. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP block 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual IO pads connected, for example, to the IO logic element 47 typically are not confined to the area of the input/output logic element 47.

In the pictured example, a horizontal area near the center of the die (shown in FIG. 5) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic.

Note that FIG. 5 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 5 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A computing system, comprising:
a host comprising a processing unit, a home agent (HA), and an accelerator application; and
an accelerator device communicatively coupled to the host, wherein the accelerator device comprises a request agent (RA) configured to perform at least one accelerator function, a slave agent (SA), and local memory, wherein the local memory is part of a same coherent domain as the processing unit in the host,
wherein the accelerator application is configured to transfer ownership of a data set, which was identified by the accelerator application, from the HA to the accelerator device to permit the RA to access the data set without first receiving permission from the HA,
wherein the accelerator device is configured to:
store a latest copy of the data set into the local memory,
service a memory request from the RA using the SA, and
transfer ownership of the data set back to the HA.

2. The computing system of claim 1, wherein the data set is a subportion of a memory block or memory page.

3. The computing system of claim 2, wherein after transferring ownership of the data set from the HA to the accelerator device, a remaining portion of the memory block or the memory page continues to be homed by the HA.

4. The computing system of claim 1, wherein servicing the memory request from the RA using the SA is performed without receiving permission from the HA.

5. The computing system of claim 1, wherein the processing unit comprises a cache, wherein the cache stores a modified version of the data set.

6. The computing system of claim 5, wherein the accelerator device is configured to:
transmit, after ownership of the data set has been transferred to the accelerator device, a flush command to the HA instructing the processing unit to flush the cache so that the modified version of the data set is moved into the local memory.

7. The computing system of claim 6, wherein the processing unit is configured to, in response to the flush command, one of:
invalidate the modified version of the data set in the cache; and
keep a cached clean copy of the modified version of the data set for future low-latency re-reference.

8. The computing system of claim 5, wherein the accelerator application is configured to:
transmit, before ownership of the data set has been transferred to the accelerator device, a flush command to the HA instructing the processing unit to flush the cache so that the modified version of the data set is moved into the local memory.

9. The computing system of claim 8, wherein the accelerator application is configured to:
transmit, before ownership of the data set has been transferred to the accelerator device, an invalidate command to the HA instructing the processing unit to invalidate the cache.

10. An accelerator device, comprising:
a request agent (RA) comprising a compute engine configured to perform at least one accelerator function;
a slave agent (SA) comprising a memory controller; and
memory,
wherein the SA is configured to receive ownership of a data set from a home agent (HA) in a host coupled to the accelerator device to permit the RA to access the data set without first receiving permission from the HA, wherein the data set was identified by a software accelerator application and the ownership is transferred by the software accelerator application,
wherein the memory controller is configured to service a request, transmitted by the compute engine, to access the data set stored in the memory once ownership has been transferred to the SA, and
wherein the RA is configured to transfer ownership from the SA back to the HA.

11. The accelerator device of claim 10, wherein the data set is a subportion of memory block or memory page, wherein after transferring ownership of the data set from the HA to the SA, a remaining portion of the memory block or the memory page continues to be homed by the HA.

12. The accelerator device of claim 11, wherein servicing the request is performed without receiving permission from the HA.

13. The accelerator device of claim 10, wherein the accelerator device is configured to communicate with the host using a coherent interconnect protocol to extend a coherent domain of the host to include the memory and the SA in the accelerator device.

14. A method, comprising:
identifying a data set using an accelerator application executing on a host;
transferring, by the accelerator application, ownership of a data set from a home agent (HA) in the host to an accelerator device to permit the accelerator device to access the data without first receiving permission from the HA, wherein the accelerator device is communicatively coupled to the host and a coherent domain of the host is extended into the accelerator device;
moving the data set into local memory in the accelerator device;
servicing a memory request from a request agent (RA) in the accelerator device using a slave agent (SA) in the accelerator device; and transferring ownership from the accelerator device back to the HA.

15. The method of claim 14, further comprising:
wherein the data set is a subportion of memory block or memory page.

16. The method of claim 15, wherein after transferring ownership of the data set from the HA to the accelerator device, a remaining portion of the memory block or the memory page continues to be homed by the HA.

17. The method of claim 14, wherein servicing the memory request from the RA using the SA is performed without receiving permission from the HA.

18. The method of claim 14, further comprising:
modifying the data set using a processing unit in the host, wherein the modified data set is stored in a cache associated with the processing unit; and
receiving a flush command at the HA instructing the processing unit to flush the cache so that the modified data set is moved into the local memory after ownership of the data set has been transferred to the accelerator device.

19. The method of claim 14, further comprising:
modifying the data set using a processing unit in the host, wherein the modified data set is stored in a cache associated with the processing unit; and
flushing the modified data set in the cache before transferring ownership to the accelerator device.

20. The method of claim 19, further comprising:
invalidating the modified data set in the cache in response to a cache maintenance operation (CMO) issued by the accelerator device after transferring ownership to the accelerator device.

* * * * *